United States Patent
Jaggard

(10) Patent No.: US 8,186,630 B2
(45) Date of Patent: May 29, 2012

(54) LEADING EDGE STRUCTURE FOR AN AEROFOIL

(75) Inventor: Philip Robert Jaggard, Bristol (GB)

(73) Assignee: Airbus Operations Limited, Bristol (GB)

( * ) Notice: Subject to any disclaimer, the term of this patent is extended or adjusted under 35 U.S.C. 154(b) by 347 days.

(21) Appl. No.: 12/448,215

(22) PCT Filed: Jan. 8, 2008

(86) PCT No.: PCT/GB2008/050015
§ 371 (c)(1),
(2), (4) Date: Jun. 12, 2009

(87) PCT Pub. No.: WO2008/084260
PCT Pub. Date: Jul. 17, 2008

(65) Prior Publication Data
US 2010/0084515 A1  Apr. 8, 2010

(30) Foreign Application Priority Data
Jan. 11, 2007  (GB) .................................. 0700604.2

(51) Int. Cl.
*B64C 3/50* (2006.01)
(52) U.S. Cl. ........................................ 244/214; 244/213
(58) Field of Classification Search ........... 244/213–217
See application file for complete search history.

(56) References Cited

U.S. PATENT DOCUMENTS

| | | | |
|---|---|---|---|
| 3,743,219 A | 7/1973 | Gorges | |
| 3,847,369 A | 11/1974 | Phillips et al. | |
| 4,040,579 A | 8/1977 | McKiney | |
| 4,042,191 A | 8/1977 | Johnson | |
| 4,159,089 A | 6/1979 | Cole | |
| 4,650,140 A | 3/1987 | Cole | |
| 4,915,327 A | 4/1990 | Ellmers et al. | |
| 5,158,252 A | 10/1992 | Sakurai | |
| 5,474,265 A | 12/1995 | Capbern et al. | |
| 6,375,126 B1 | 4/2002 | Sakurai et al. | |
| 2007/0241236 A1* | 10/2007 | Whitehouse et al. | 244/214 |

FOREIGN PATENT DOCUMENTS

| | | |
|---|---|---|
| EP | 1 338 506 | 8/2003 |
| GB | 998895 | 7/1965 |
| GB | 2 201 384 | 9/1988 |
| WO | WO 00/07876 | 2/2000 |

OTHER PUBLICATIONS

International Search Report for PCT/GB2008/050015, mailed Jul. 2, 2008.
Written Opinion of the International Searching Authority for PCT/GB2008/050015, mailed Jul. 2, 2008.
UK Search Report for GB Application No. 0700604.2, dated May 11, 2007.

* cited by examiner

*Primary Examiner* — Timothy D Collins
*Assistant Examiner* — Jamie S Stehle
(74) *Attorney, Agent, or Firm* — Nixon & Vanderhye P.C.

(57) ABSTRACT

A leading edge structure is disclosed for an aircraft wing in which a droop nose is articulated by a double hinge.

6 Claims, 5 Drawing Sheets

LEADING EDGE STRUCTURE FOR AN AEROFOIL

This application is the U.S. national phase of International Application No. PCT/GB2008/050015 filed 8 Jan. 2008, which designated the U.S. and claims priority to Great Britain Application No. 0700604.2 filed 11 Jan. 2007, the entire contents of each of which are hereby incorporated by reference.

FIELD OF INVENTION

The present invention relates to a leading edge structure for an aerofoil. Particularly, but not exclusively, the present invention relates to a droop nose for an aircraft wing.

BACKGROUND OF THE INVENTION

Aerofoils, such as those used in aircraft, commonly comprise leading or trailing edge structures. These structures are arranged to modify the shape of the aerofoil to enable the aerodynamic lift of the aerofoil to be modified. Primarily, the lift is modified so as to reduce the stall speed of the aerofoil during take-off or landing of an aircraft.

Leading edge structures commonly comprise a fixed part, fixed to the wing box, and a movable part, hinged on the fixed part. Actuators are arranged to move the movable part between a stowed position, in which the lift of the aerofoil is suitable for aircraft flight at cruising speeds, and a deployed position in which the aerofoil lift is increased for the lower speeds of takeoff or landing.

In some leading edge structures, such as droop noses, the stowed moveable part provides the leading edge surface for the aerofoil. The stowed movable part sits forward of the fixed part which itself has a leading edge surface that is at least partly covered by the stowed movable part. In its deployed position, the movable part hinges downwards and exposes the covered section of the leading edge surface of the fixed part.

The movable leading edge structure itself has a trailing edge, which borders the leading edge surface of the fixed part. There are a number of problems relating to this area of the leading edge structure. For example, when the movable part is deployed, its trailing edge can lift due to the aerodynamic pressure differential on the aerofoil. Such lifting may cause air to be forced between the movable and fixed parts of the leading edge structure, thus reducing the efficiency of the aerofoil by increasing drag. In order to reduce this problem, the trailing edge is biased against the exposable leading edge of the fixed part. However, this biasing can result in significant wear between the movable part trailing edge and the exposable leading edge surface of the fixed part. Another problem with this structure is the shape of the exposable leading edge surface of the fixed part has to be profiled to accommodate the position of the trailing edge of the movable part as it moves between the stowed and deployed positions. Thus the profile of the exposable leading edge surface may not be optimal. Furthermore, the transition between the trailing edge of the deployed movable part and the exposed leading edge surface of the fixed part may be not be aerodynamically optimal.

SUMMARY OF THE INVENTION

An embodiment of the invention provides a leading edge structure for an aerofoil, the leading edge structure comprising:

a fixed leading edge structure for attachment to a wing box, the fixed leading edge structure having an aerofoil surface;
a moveable leading edge structure comprising a trailing edge, the movable leading edge structure being attached to the fixed leading edge structure by a first and second set of hinge arms, each of the hinge arms being pivotably engaged with the fixed and
moveable leading edge structures and arranged to define the movement of the moveable leading edge structure relative to the fixed leading edge structure;
an actuator arranged to act on the movable leading edge structure so as to move the moveable leading edge structure between a deployed position and a stowed position relative to the fixed leading edge structure,
wherein the first and second hinge arms are arranged to hold the trailing edge of the moveable leading edge structure adjacent the aerofoil surface of the fixed leading edge structure in the deployed and stowed positions and to maintain the trailing edge away from the aerofoil surface for a substantial part of the movement of the movable leading edge structure between the deployed and stowed positions.

The aerofoil surface may comprise an exposable leading edge covered by the moveable leading edge structure in the stowed position and exposed by the moveable leading edge structure when the moveable leading edge structure is in the deployed position and the trailing edge may move in an arc during the movement, the arc meeting the aerofoil surface at substantially the position of the trailing edge in the deployed and stowed positions and the arc having a greater degree of curvature than the exposable leading edge. The arc may comprise the combined loci of the ends of the hinge arms as the hinge arms rotate about their attachment points to the fixed leading edge structure.

The trailing edge may comprise a seal member arranged to seat between the movable leading edge structure and the exposable leading edge when the moveable leading edge structure is in its deployed and stowed positions. The trailing edge may abut the exposable leading edge when the moveable leading edge structure is in its deployed and stowed positions. In the deployed position the aerofoil surface of the trailing edge and the exposable leading edge may be arranged so that they together provide a substantially contiguous surface having a substantially continuous degree of curvature over the transition between the movable leading edge structure and the fixed leading edge structure. The leading edge structure may be arranged as a droop nose for an aircraft wing.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
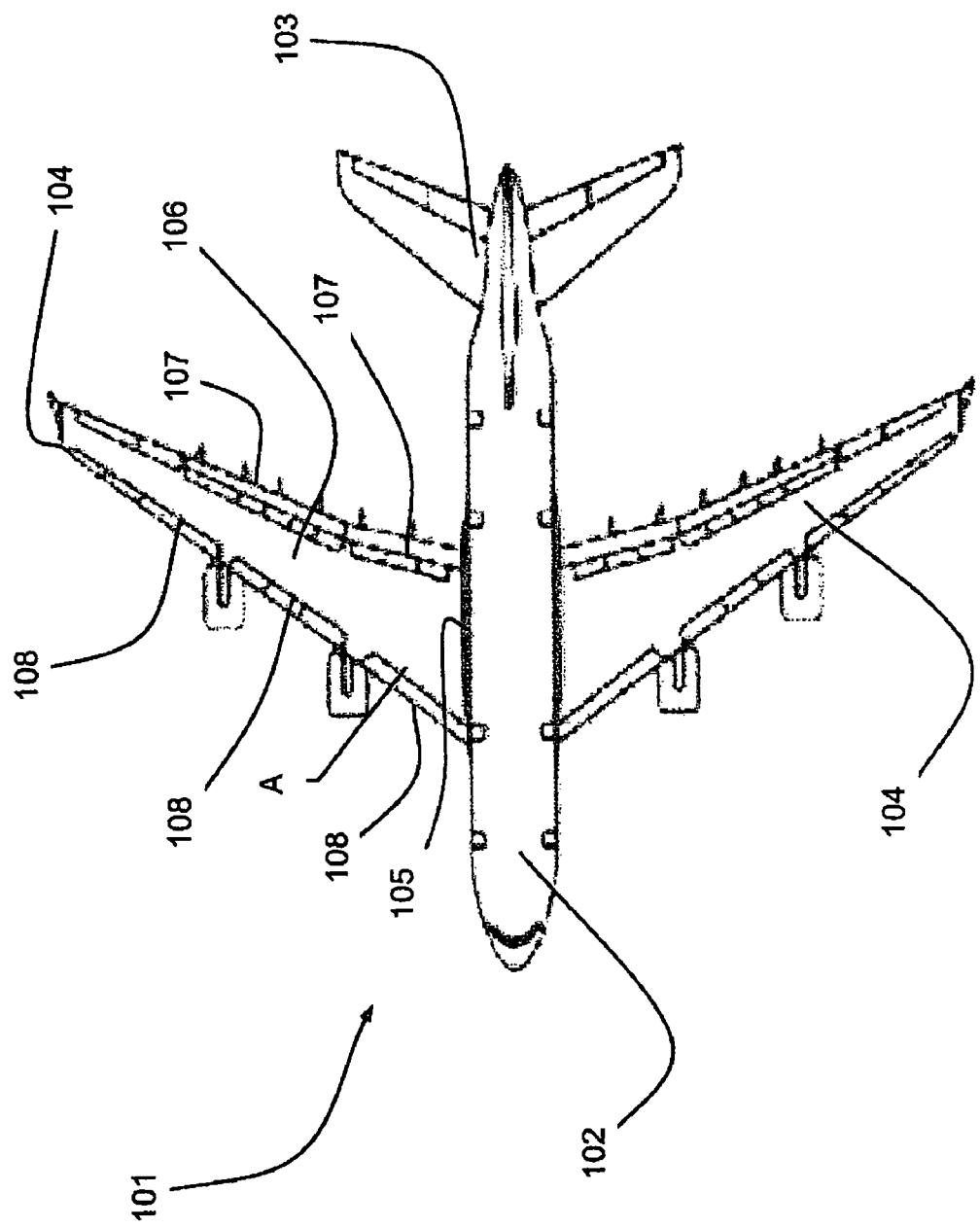
FIG. 1 is a plan view of an aircraft.

With reference to FIG. 1, an aircraft 101 comprises a fuselage 102 with an attached tail plane 103 and pair of wings 104. The wings 104 are faired into the fuselage 102 via a set of fairings 105. Each wing 104 comprises a wing box 106 providing the main structural element of the wing. The wing box also provides the central sections of the upper and lower aerofoil surfaces for the wing in addition to attachment points for engines and control surfaces such as trim flaps and airbrakes. The wing box 106 also provides the supporting structure for a set of trailing edge structures 107 in the form of flaps, spoilers and ailerons and also leading edge structures 108 in the form of droop noses and slats.

Figure 2:
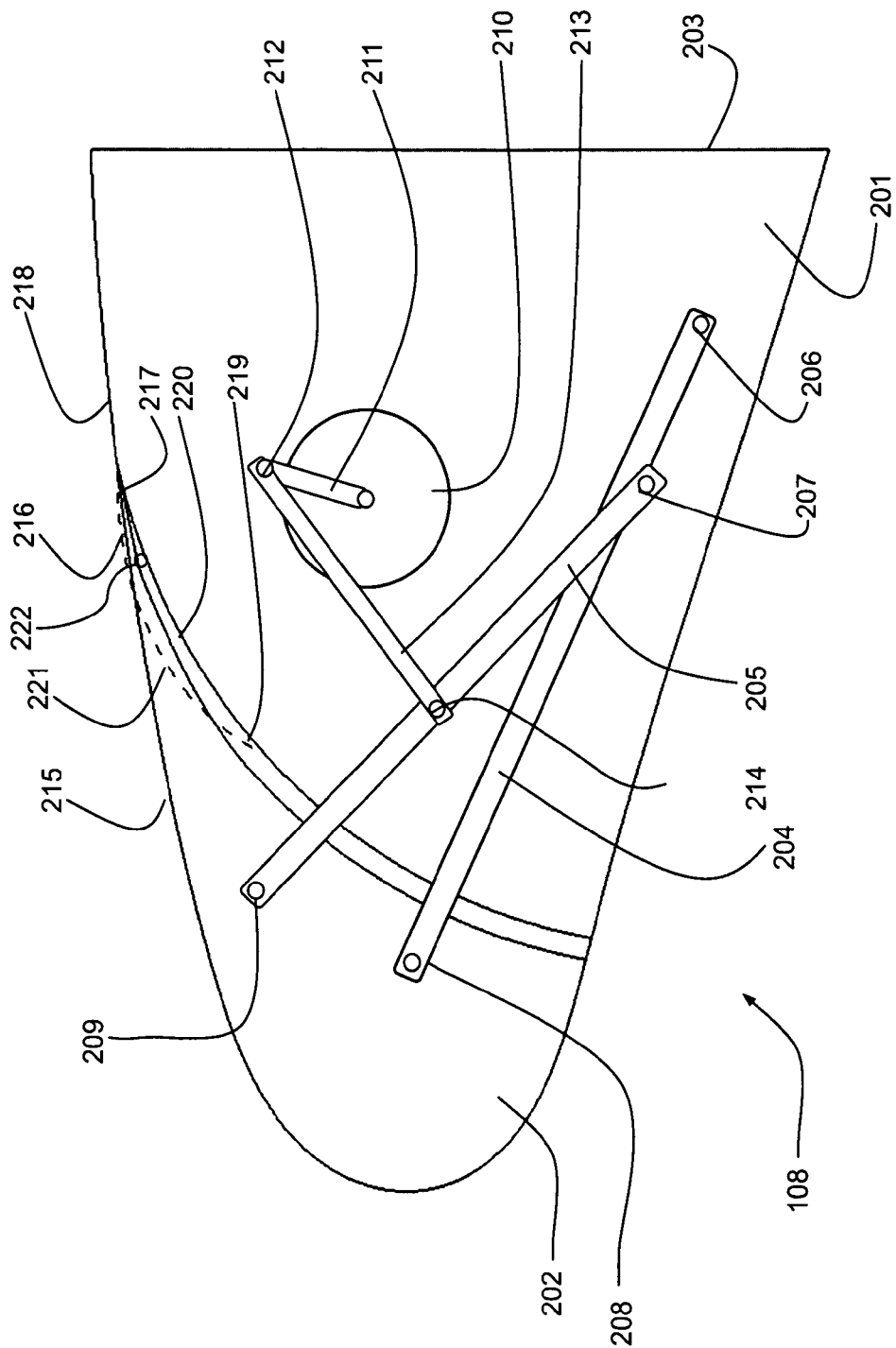
FIG. 2 is a cross sectional view along line A-A in FIG. 1 of a leading edge structure.

FIG. 2 shows a cross section along line A-A of one of the leading edge structures of FIG. 1. The leading edge structure 108 comprises two main elements in the form of a fixed leading edge structure 201 and a movable leading edge structure 202 forming a droop nose. The fixed leading edge structure 201 is arranged along one side 203 to be fixed to the wing box 106. The droop nose 202 is attached to the fixed leading edge structure by first and second sets of hinge bars 204, 205 pivotably fixed to the fixed leading edge structure 201 at a first and second set of respective pivot points 206, 207. The first and second sets of hinge bars 204, 205 are also pivotably fixed to the droop nose 202 at a third and fourth set of respective pivot points 208, 209. An actuator 210 is attached to the fixed leading edge structure 201 and comprises an actuator arm 211 connected via a pivotable joint 212 to one end of a link arm 213. The other end of the link arm 213 is attached via a further pivotable joint 214 to one of the second set of hinge arms 205.

The leading edge structure 108 extends span-wise along the forward or leading edge of the wing 104 and thus each member of the sets of hinge arms 204, 205 and respective pivot points 206, 207, 208, 209 are distributed span-wise within the leading edge structure. While a number of actuators 210 are provided, not every one of the second set of hinge arms 205 is directly connect to an actuator. Each set of pivot points 206, 207, 208, 209 are arranged along a respective generally span-wise axis. The droop nose 202 provides a leading edge aerofoil surface 215 for the wing, which extends over the whole of the exposed, forward facing surface of the droop nose 202. The droop nose 202 is shown in FIG. 2 in its stowed position, that is its position for normal flight at cruising speeds of the aircraft 101. In the stowed position, the upper trailing edge 216 of the droop nose 202 is adjacent a first position 217 on the leading edge aerofoil surface 218 provided by the fixed leading edge structure 201.

The actuator 210 is arranged to move the droop nose 202 into a deployed position as described in further detail below. When activated, the actuator 210 acts through the actuator arm 211 and link arm 213 to rotate the first and second hinge arms 204, 205 about their respective first and second pivot points 206, 207 and thus moves droop nose 202 generally downwards and forwards into its deployed position. In the deployed position, the trailing edge 216 of the droop nose 202 is positioned adjacent a second position 219 on the leading edge aerofoil surface 218 of the fixed leading edge structure 201. The movement of the droop nose 202 from the stowed position to the deployed position exposes a part 220 of the leading edge aerofoil surface 218 referred to herein as the exposable leading edge 220.

In FIG. 2, an arc 221 shown by a dotted line between the first and second positions 217, 219 illustrates the locus of the trailing edge 216 during the movement of the droop nose 202 between its stowed and deployed positions. The arc 221 is the combination of the loci of the third and fourth sets of pivot points 208, 209, which are defined by the first and second hinge arms 204, 205 and the relative positions of the first and second sets of pivot points 206, 207. The arc 221 shows that the trailing edge 216 is positioned adjacent the exposable leading edge 220 in both the stowed and deployed positions 217, 219 respectively. However, the trailing edge 216 is maintained spaced from the exposable leading edge 220 during its movement between the stowed and deployed positions.

Figure 3:
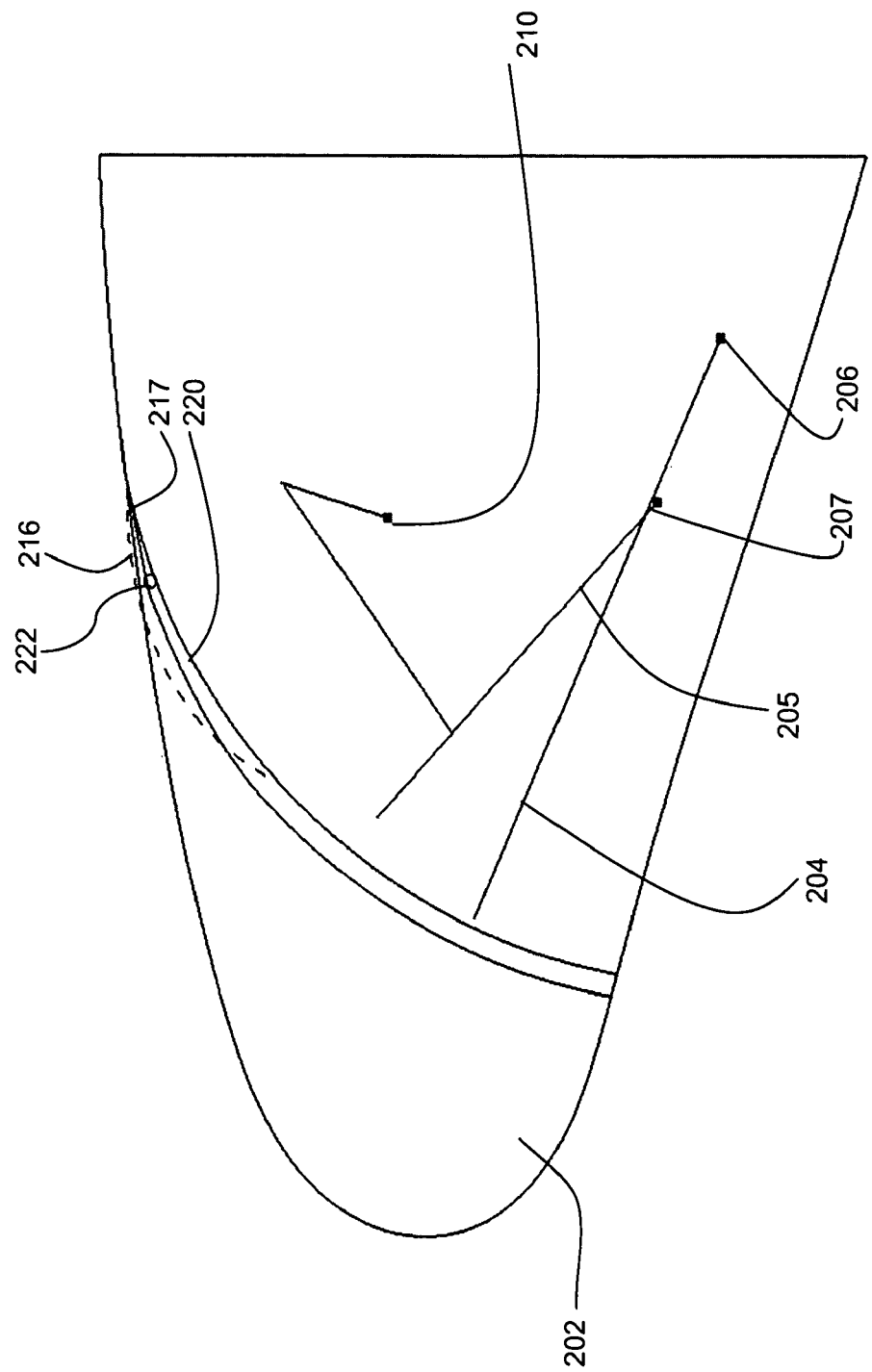
FIGS. 3, 4 and 5 are a set of simplified cross sectional views illustrating the movement of the leading edge structure of FIG. 2 between a stowed and deployed position.

The movement of the droop nose 202 between its stowed and deployed positions will now be described further with reference to FIGS. 3, 4 and 5. In these figures, the hinge arms 204, 205 are each indicated by a line representing their respective longitudinal axes. The first and second sets of pivot points 206, 207 are shown by dots representing their axes of rotation and the third and fourth sets of pivot points 208, 209 are omitted for clarity. FIG. 3 shows the droop nose 202 in its stowed position in which the trailing edge 216 is adjacent the exposable leading edge 220 at the first position 217. The axes of the first set of hinge arms 204 are positioned above the second set of pivot points 207. The action of the actuator 210 in a clockwise direction acts through the hinge arms 204, 205 to hold the droop nose in this stowed position.

Figure 4:
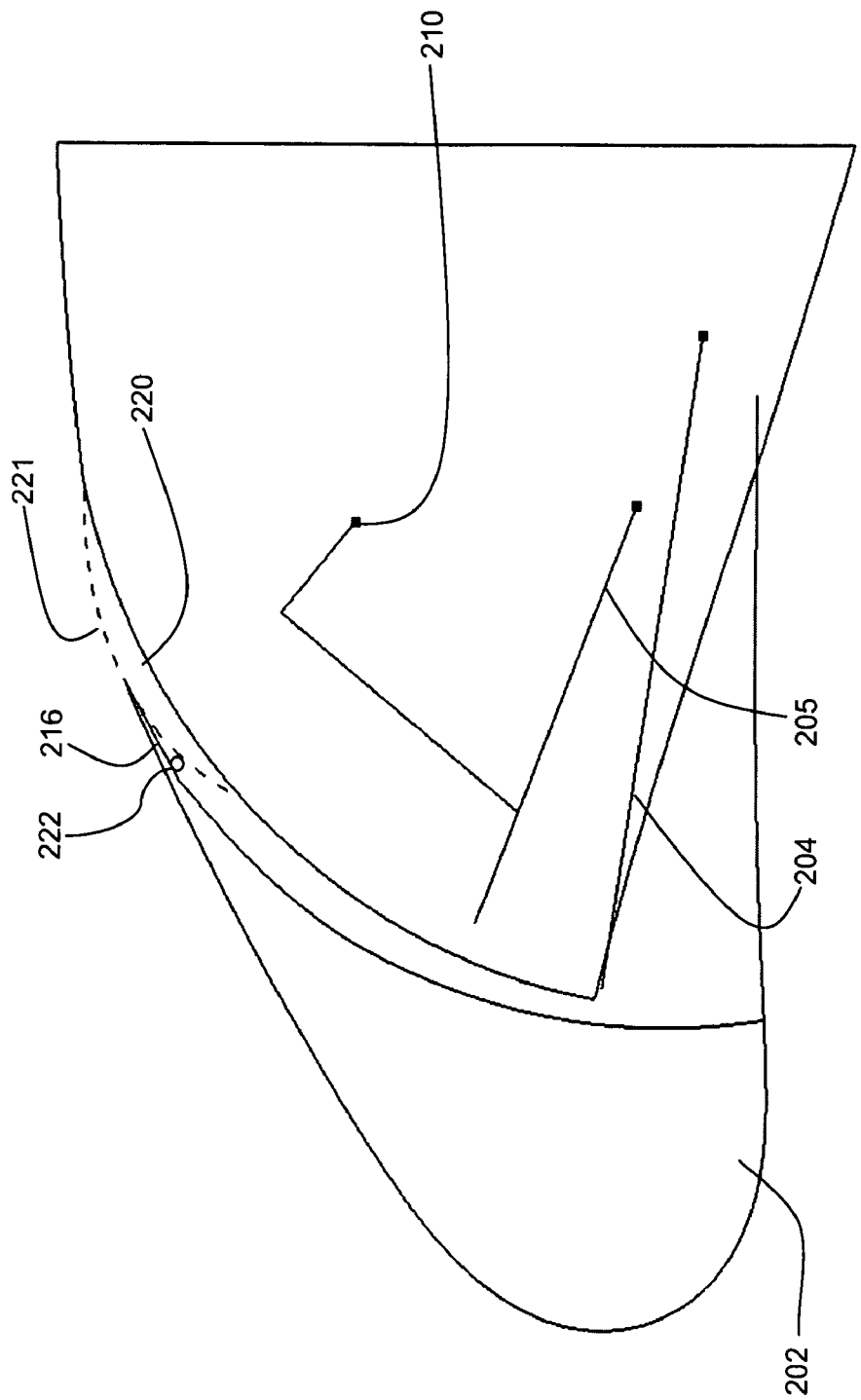

With reference to FIG. 4, when the droop nose 202 is deployed, the actuator 210 moves in an anticlockwise direction so as to rotate the hinge arms 204, 205 downwards. The geometry of the hinge arms and their respective pivot points serves to move the droop nose both forwards and downwards. In addition, the double hinge mechanism causes the droop nose to rotate or pivot about its span-wise axis in an anticlockwise direction during the deployment movement so as to maintain the trailing edge 216 away from the exposable leading edge 220. The trailing edge 216 moves along the arc 221.

Figure 5:
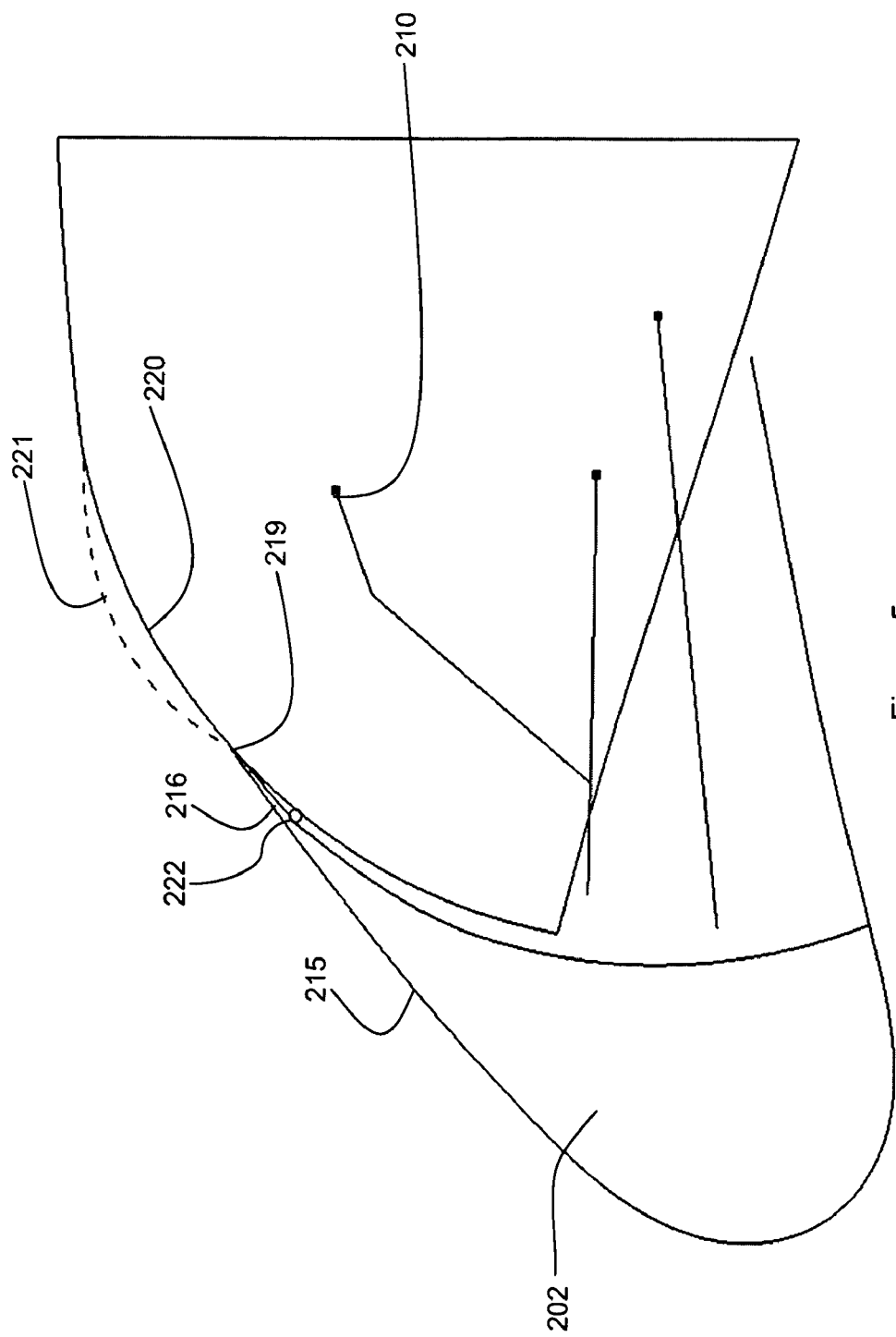

With reference to FIG. 5, when the actuator 210 has moved the droop nose to its fully deployed position, the trailing edge 216 sits adjacent the second position 219 on the exposable leading edge 220 having moved back towards the exposable leading edge 220 along the arc 221. As shown in FIG. 5, in the deployed position, the area of the leading edge aerofoil surface 215 provided by the trailing edge 216 is arranged to form a substantially contiguous aerofoil surface having a continuous degree of curvature over the transition between the droop nose 202 and the fixed leading edge structure 201.

In another embodiment, the trailing edge may abut the exposable leading edge at or near its deployed or stowed positions. In a further embodiment the trailing edge or the exposable leading edge may be provided with flexible seal 222 arranged to seat between the trailing edge and the exposable leading edge in the deployed or stowed positions. In a further embodiment, the actuator is connected to the other hinge arm. In another embodiment, the actuator is linked to another part of the droop nose.

As will be understood, by those skilled in the art, the hinge arm may be adjustable to enable the droop nose to be appropriately rigged. Rigging is commonly facilitated, for example, by adjustable length struts or eccentric pivot points.

Articulating the droop nose as described above enables any gap between the droop nose trailing edge and the exposable leading edge to be reduced in both the deployed and stowed positions. The reduced gap helps to minimise blow through between the fixed and moving parts of the leading edge structure, thus reducing drag. Furthermore, moving the trailing edge of the droop nose away from the exposable leading edge during the transition between the deployed and stowed positions reduces wear on the exposable leading edge surface. The exposable leading edge surface may also be profiled so that when the droop nose is deployed, the leading edge of the aerofoil remains aerodynamically efficient. In other words, the difference in curvature between the trailing edge aerofoil surface and the exposable leading edge surface is minimised. Providing a double hinge mechanism for the droop nose also enables a greater forward movement during deployment when compared to a single hinge mechanism. In other words, one of the hinge arms provides the hinging mechanism for the droop nose while the other controls the pitch of the droop nose.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A leading edge structure for an aerofoil, said leading edge structure comprising:
    a fixed leading edge structure for attachment to a wing box, said fixed leading edge structure having upper and lower aerofoil surfaces;
    a droop leading edge structure comprising a trailing edge, said droop leading edge structure attached to said fixed leading edge structure by first and second hinge arms, each of said hinge arms being pivotably engaged with said fixed leading edge structure and said droop leading edge structure, said hinge arms configured to define the movement of said droop leading edge structure relative to said fixed leading edge structure;
    an actuator configured to act on said droop leading edge structure so as to move said droop leading edge structure between a deployed position and a stowed position relative to said fixed leading edge structure, wherein the droop leading edge structure in the stowed position provides the leading edge surface for the aerofoil, and said first and second hinge arms are configured to hold said trailing edge of said droop leading edge structure in contact with said upper aerofoil surface of said fixed leading edge structure in both said deployed and stowed positions and to move said trailing edge apart from said upper aerofoil during movement of said droop leading edge structure between said deployed and stowed positions.

2. A leading edge structure according to claim 1 in which said upper aerofoil surface comprises an exposable leading edge covered by said droop leading edge structure in said stowed position and exposed by said droop leading edge structure when said droop leading edge structure is in said deployed position and said trailing edge moves in an arc during said movement, said arc meeting said upper aerofoil surface at substantially the position of said trailing edge in said deployed and stowed positions and said arc having a greater degree of curvature than said exposable leading edge.

3. A leading edge structure according to claim 2 in which said arc comprises the combined loci of the ends of said hinge arms as said hinge arms rotate about their attachment points to said fixed leading edge structure.

4. A leading edge structure according to claim 1 in which said trailing edge comprises a seal member arranged to seat between said droop leading edge structure and said upper aerofoil surface when said droop leading edge structure is in both of said deployed and stowed positions.

5. A leading edge structure according to claim 1 in which said trailing edge abuts said upper aerofoil surface when said droop leading edge structure is in both of said deployed and stowed positions.

6. A leading edge structure according to claim 1 in which in said deployed position an upper aerofoil surface of said trailing edge and said upper aerofoil surface are configured to provide a substantially contiguous surface having a substantially continuous degree of curvature over the transition between said droop leading edge structure and said fixed leading edge structure.

* * * * *